United States Patent
Mody et al.

(10) Patent No.: US 10,331,464 B2
(45) Date of Patent: Jun. 25, 2019

(54) METHOD AND SYSTEM FOR AN ADAPTIVE CONTEXTUAL INSTRUCTION TOOL

(71) Applicant: Dropbox, Inc., San Francisco, CA (US)

(72) Inventors: Viraj Mody, San Francisco, CA (US); Stefano Cayre, San Francisco, CA (US); Jacob Hurwitz, San Francisco, CA (US); Nick Rolph, San Francisco, CA (US); Aadil Sarfani, San Francisco, CA (US); Alexander Embiricos, San Francisco, CA (US); Genevieve Sheehan, San Francisco, CA (US); Huy Nguyen, Foster City, CA (US)

(73) Assignee: DROPBOX, INC., San Francisco, CA (US)

( * ) Notice: Subject to any disclaimer, the term of this patent is extended or adjusted under 35 U.S.C. 154(b) by 695 days.

(21) Appl. No.: 14/857,642

(22) Filed: Sep. 17, 2015

(65) Prior Publication Data

US 2017/0083348 A1 Mar. 23, 2017

(51) Int. Cl.
*G06F 9/451* (2018.01)
*G06F 3/14* (2006.01)
*G06F 3/0481* (2013.01)
*G06F 9/445* (2018.01)

(52) U.S. Cl.
CPC ............ *G06F 9/453* (2018.02); *G06F 3/0481* (2013.01); *G06F 3/14* (2013.01); *G06F 9/4451* (2013.01)

(58) Field of Classification Search
CPC ................................ G06F 3/0481; G06F 9/453
See application file for complete search history.

(56) References Cited

U.S. PATENT DOCUMENTS

| | | | | |
|---|---|---|---|---|
| 6,262,730 B1* | 7/2001 | Horvitz | .................... | G06N 5/00 |
| | | | | 715/707 |
| 6,658,598 B1* | 12/2003 | Sullivan | .............. | G06F 11/2294 |
| | | | | 714/25 |
| 6,678,706 B1* | 1/2004 | Fishel | ..................... | G06F 9/453 |
| | | | | 715/205 |
| 6,694,314 B1* | 2/2004 | Sullivan | ............ | G06F 16/90344 |
| 9,804,730 B2* | 10/2017 | Lefor | .................... | G06F 3/0481 |
| 2001/0017632 A1* | 8/2001 | Goren-Bar | .............. | G06F 9/451 |
| | | | | 715/744 |
| 2002/0015056 A1* | 2/2002 | Weinlaender | ........... | G06F 9/453 |
| | | | | 715/705 |
| 2004/0006480 A1* | 1/2004 | Ehlen | ..................... | G10L 15/22 |
| | | | | 704/276 |
| 2008/0065390 A1* | 3/2008 | Ativanichayaphong | ..................... | |
| | | | | G09B 5/06 |
| | | | | 704/270 |

(Continued)

OTHER PUBLICATIONS

Wikipedia, the free encyclopedia,"Office Assistant", https://en.wikipedia.org/wiki/Office_Assistant, dated Aug. 30, 2015, 3 pages.

*Primary Examiner* — William L Bashore
*Assistant Examiner* — Nathan K Shrewsbury
(74) *Attorney, Agent, or Firm* — Hickman Palermo Becker Bingham LLP

(57) ABSTRACT

A system and method for increasing user engagement with an online service. The system includes a contextual instruction tool that teaches users about features of the online service. The system provides instruction according to different contexts of a user's interaction on their device. The instructions to the user may be in near-real time to the interaction or sometime after the interaction.

26 Claims, 6 Drawing Sheets

(56) References Cited

U.S. PATENT DOCUMENTS

| | | | |
|---|---|---|---|
| 2011/0307818 A1* | 12/2011 | Eby | G06Q 10/103 |
| | | | 715/769 |
| 2014/0317536 A1* | 10/2014 | Liu | G06F 3/0482 |
| | | | 715/760 |
| 2015/0074231 A1* | 3/2015 | Nigam | G06F 17/30893 |
| | | | 709/219 |
| 2015/0206063 A1* | 7/2015 | Santero | G06N 5/00 |
| | | | 706/12 |
| 2015/0340033 A1* | 11/2015 | Di Fabbrizio | G10L 15/18 |
| | | | 704/254 |

\* cited by examiner

METHOD AND SYSTEM FOR AN ADAPTIVE CONTEXTUAL INSTRUCTION TOOL

TECHNICAL FIELD

The present disclosure relates to encouraging greater user engagement with a computer application and, more particularly, to teach users how to use different features of the application.

BACKGROUND

Users rely on different online services to make their work or personal lives more efficient. However, because there are often many competing requests for users' attention, these online services need to compete not only in getting users to sign-up to use the online service, but also in keeping them engaged with the online service. Otherwise, users may begin to use the online service less and less, until finally the user stops using the online service entirely. On the other hand, engaged users are often passionate about online services they use, making it more likely they will not only continue using the service, but also potentially upgrade their level of service with the online service and recommend it to friends, family, and coworkers.

One way to do this is by continually improving the online service, so that it offers more reasons for users to not only continue using functionality users have already encountered, but also offers new ways to make the online service even more helpful. In the Internet context, where online service feature sets are continuously enriched and expanded, teaching users about features is especially tricky. For example, an online service may wish to promote to a user a feature of their service. This may be a feature that the user has never used before, such as a new or recently improved feature of the online service. The challenge for the service, then, becomes how to get the user to try the feature.

One way to let users know about new features is to display, for example on a landing web page, information on the new features. Another way to teach users how to use new features is to develop comprehensive documentation for users to review and learn about the new features. However, these are cumbersome approaches that users oftentimes ignore. For example, users shown new features on the landing page may not understand how these features may help them. Additionally, users may not want to go through documentation to learn how to use features or may not have the energy or time to do so.

Therefore, there is a need for improved methods to get users more engaged with an online service.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Figure 1:
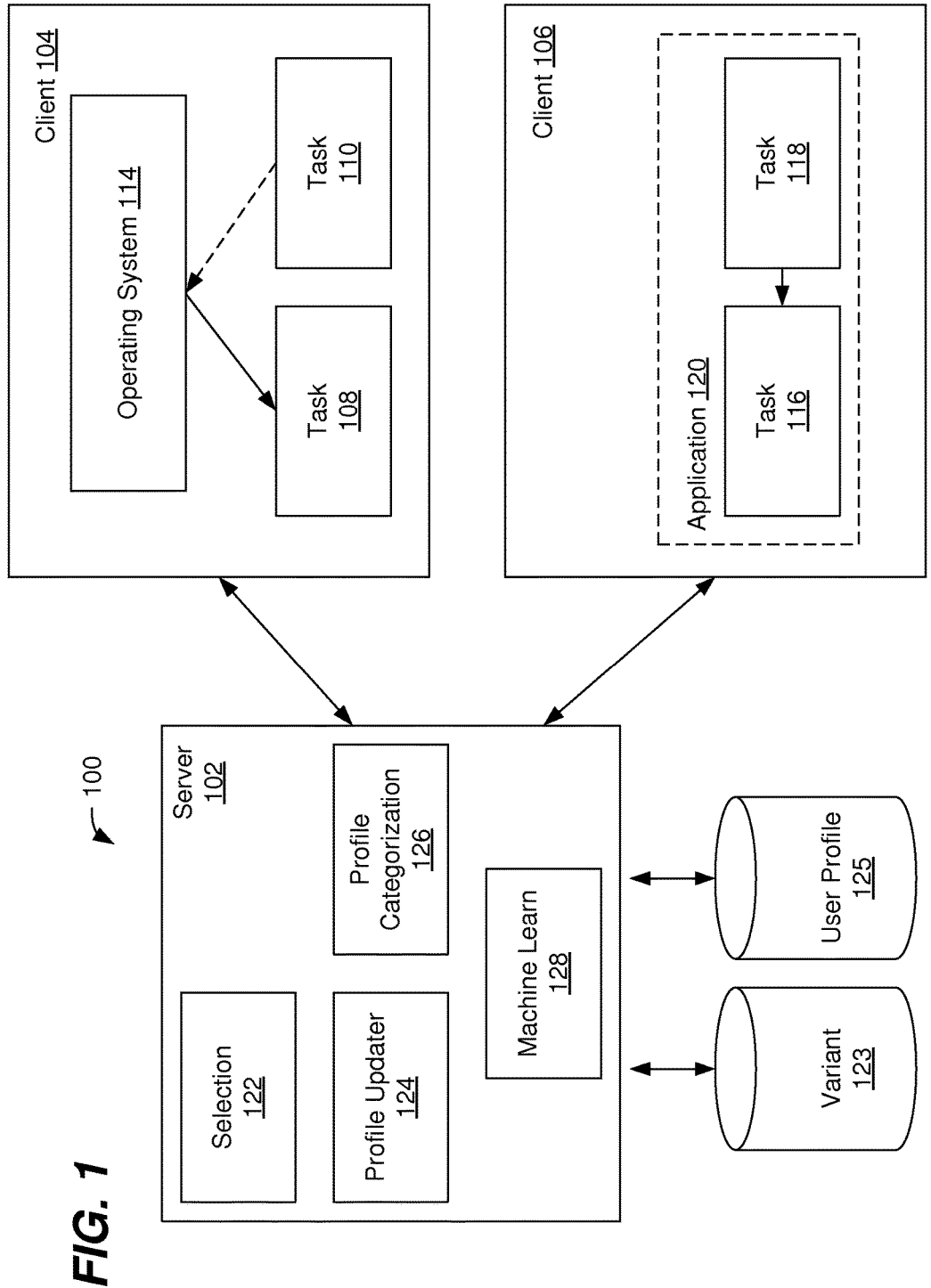
FIG. 1 illustrates an example system in which the techniques described may be practiced according to certain embodiments.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method implementing techniques for encouraging user engagement with an online service. The system includes a contextual instruction tool that teaches users about features of the online service. The tool provides instruction in context with a user's interaction with the online service on their device.

Users may become frustrated with an online service when, although the online service provides a feature they want to use, they cannot figure out how to use the feature or in what context (or situation) to do so. For example, for a content management system, a user's goal may be to upload to the content management system a content item the user currently has stored on their device. The content item may be a file or other unit of content used to organize data on the user's device. In embodiment, the content management system includes an online content item storage service. The content management system may offer multiple ways to achieve the user's goal that the user may not be aware of One way to upload a content item from the user's device might involve right-clicking on the content item in a graphical file system browser and selecting an upload option from a pop-up menu. Another way to upload a content item might involve copying or moving the content item from its current location in a file system to a specially designated location in the file system. A new way to upload a file the user is not be aware of may be clicking a button on a notification that appears when the user is interacting with the content item. The system may select any of these methods to teach the user how to upload the content item. According to some techniques of the subject innovations, a user is informed about the various ways to upload a content item to a content management system in the context of interacting with the content item.

In an embodiment, the system includes the testing of variants to determine the efficacy of different variants used to teach users about features of the system. A variant may include various parts, such as a featured function, a behavior, and a consequence. The variants may be tested to determine its effectiveness (e.g., how often a user indicates they accept a behavior, comparison of variants among each other, how popular a featured function is, how effective a consequence is, or other measures of effectiveness). The system receives a first interaction a user makes at a system, such as an interaction with an operating system, an application, or other installed software on the user's device. Then, depending on a context of the first interaction, the system may transfer a variant based on the interaction. The variant's behavior may be executed after the first interaction. For example, the variant's behavior may include a request to the user on whether or not the user would like to execute the variant. If the user chooses to execute the variant, the variant's consequence is executed. This may include tutorial information that guides the user on how to use a feature of the system.

In further embodiments, the system may include contexts (or profiles) allowing the system to cater to different categories of users. These categories may be determined in advance, or defined by the system based on user behaviors and interactions. This may include different machine learning capabilities of the system. For example, the system may assign the user, such as the user discussed above, a user category based on the first interaction. Then, the system may select the variant for the user based on the user category determined by the system and execute the variant's behavior once a second behavior has occurred. An example of this includes a user category of new user. The first interaction may be starting an application on a user's device and a second interaction may be logging onto the system. The variant loaded onto the user's device may include a new user tutorial consequence, which executes automatically with or without the user's acceptance. Another example of this includes a user category of content item moving using a file system. The first interaction may include the user dragging-and-dropping a content item into a monitored folder of the system. The variant loaded onto the user's device may include a right-click consequence, which is a second way to move content items into the system.

Example Embodiment

In an embodiment, the system includes gathering information about interactions users make at a device. These interactions are collected to assist the system in determining what and how to instruct users to use features of the system. As discussed in detail elsewhere in this application, the collection of various interactions users make at a device may be made compliant to a privacy policy of the system.

These interactions may include interactions made by users with software components of the device, such as an operating system file system or installed applications on the device. The information gathered may include various metadata elements, such as an identifier of the component users are interacting with as well as various metadata associated with the interactions.

In an embodiment, the system includes indicating by a first notification from a first client device to a server that a first advisor task and a first guided task are executing on the first client device. A guided task is an application, process, program, widget, or other task installed at the device. The guided task includes one or more functions, allowing the users to complete various goals the user may have. For example, if the guided task is a content management system, a function of the service may include uploading content items stored on a computer to the content management system and the goal may be to save a content item online.

An advisor task is an application, process, program, widget, or other task installed at the device. The advisor task is responsible for collecting information to determine what variants would be useful for users. Variants are used by the system to define different types of behaviors and consequences at the device for the user. For example, a variant may include a behavior component and a consequence component. The behavior component includes a particular interface or other method that a user may use to interact with the variant (e.g., a graphical user element, options for accepting or denying a variant, or other). The consequence component includes a result when the variant is accepted (e.g., a tutorial or other teaching material). The system may release new experiments (or variants) to a first task executing at the device, without needing to update a second task executing at the device. This allows the system to quickly get user feedback on different variants, so that the most effective variants may be chosen for users. The advisor task may include a connection to a network, so that the advisor task may update variants for users from the server.

The first advisor task and first guided task may be tasks executing on the client device as a single application, as two applications, or as tasks hosted on a browser application of the client device. The advisor task receives a first interaction made at the first client device by a first user. The advisor task may include one or more methods to receive interactions and information about the interactions made by the first user to the first client device. Information may be gathered directly from an application users are interacting with. Alternatively, the information may be gathered from a different source than an application users are interacting with. Some examples of methods the advisor task may use to receive interactions include: being able to directly monitor user interactions with the guided task, being able to directly monitor user interactions with other applications of the client device, being able to monitor user interactions with an operating system of the client device, or other methods. Some examples of interactions include installing an advisor task or a guided task; logging on to an advisor task or a guided task; moving, clicking, editing, or cut-and-pasting content items in a file system; hovering over a content item in a file system with a mouse cursor, or many other types of interactions. The first interaction may include receiving from the first user a unique user identifier to access the first guided task, such as providing an account login name and password.

In an embodiment, the system determines by the first advisor task a first context for the first interaction. A context is used by the system to categorize different types of interactions made by users. The context is dependent on what kind of guided task the system is being used for. For example for a content management service, a context may include a content item moving context, a content item open context, a content item deletion context, or many other different contexts. The context may include different information on the first interaction, such as a location of the interaction, what applications were involved in the interaction, when the interaction was made, and other context information. For example, if an interaction is to save a content item in a folder of the user's device, the context may include the content item name, the content item location before and after the save, the type of content item, metadata from the content item, what was done with the content item, content item size, an application used to interact with the content item, method used to interact with the content item (e.g., a copy, a move, a cut-and-paste, an online service content item operation, or other), or any combination of these. This metadata is useful in providing greater insight on how user's use the system and allow greater customization in variants. As another example, if an interaction is to log into a guided task, the context may include a user device identifier, a user identifier, and other information.

The system may determine, based on the first context, a first featured function of the first guided task for the user. A featured function includes a method to achieve a goal for a user of the system. There may be more than one featured function for a given context. For example, a first context is saving a content item on a hard disk and the first guided task may be a content management service. The system may determine for the first context that a goal for the user is to save content items online. The corresponding featured function for the first context and goal may allow the user to save their content item on the content management service as well as locally on the user's client device. As another example, if the first context includes log on information, the featured function of the first guided task may be a high-level overview of features of the system.

In an embodiment, the system includes loading onto the first client device from the server a first variant used to promote usage of the first featured function. The variant may include various components, such as an identifier of the featured function, a behavior that asks the user if they would like to try the featured function, a consequence that is executed by the system when the variant is executed, and an efficacy measure.

The system may include receiving, by the first advisor task after the first interaction, a second interaction made at the first client device by the first user. For example, this may be an interaction from the first user after logging onto the first advisor task. The system may determine by the first advisor task a second context for the second interaction. For example, this may be a content item moving operation or other operation on the first client device. The system executes the first behavior at the first client device defined by the first variant. This may be due to a relationship the system determines about the first and second contexts. For example, the first and second contexts, may match or may have other similarities that lead the system to believe that the first user would benefit from the first variant after the second interaction. As an example, if a first interaction includes a new user logging onto the system, the system may determine the context includes a new user context and, after a second interaction of completing the log on, the system executes a first variant for new users of the system. As another example, if a first interaction includes saving a content item in a file system of the device, the system may determine the context includes a content item movement context. The system may load a variant corresponding to the content item movement context and display the variant to the user after the first interaction.

In an embodiment, the system includes using a second variant with a second user of the system. The first and second variants may include the same featured function. This may mean that, although the first and second variants share a featured function (e.g., content item move operation, new user, or other), the variants differ in their behaviors or consequences. The system may indicate by a second notification from a second client device to the server that a second advisor task and a second guided task are executing on the second client device. The system receives by the second advisor task a third interaction made at the second client device by a second user. The system determines by the second advisor task a second context for the third interaction, where the first and second contexts are the same context. The system identifies the first featured function of the second guided task, based on the second context determined by the second advisor task, for the second user. The system loads onto the second client device from the server a second variant used to promote usage of the first featured function associated with the second guided task. The first featured function for the second user may be the same one as the featured function for the first user. As described in detail elsewhere in this application, a featured function may be used to achieve the same goal for a user, but different variants may be used (e.g., different behaviors, instructions, notifications, or other). The system receives, by the second advisor task after the third interaction, a fourth interaction made at the second client device by the second user. The system determines by the second advisor task a fourth context for the fourth interaction. The system executes the second behavior at the second client device defined by the second variant.

In an embodiment, the system may compare first and second variants as discussed above, to determine an efficacy of each variant. The system may receive from the first behavior executing on the first client device a first acceptance of the first variant. An acceptance of a variant in the system may occur in numerous ways. For example, the system displays to a user a behavior associated with a variant. The behavior indicates to the user a method to accept or reject the variant, such as allowing the user to click the behavior in a first area to designate acceptance of the variant and another area to designate denial of the variant. The variant may also include only an option to accept a variant, but not deny a variant. The system executes a first consequence, defined by the first variant, at the first client. These may include one or more instructions or a tutorial explaining features (e.g., the first featured function) of the system. The system receives from the second behavior executing on the second client device a first rejection of the second variant. As discussed elsewhere in this application, the user may reject a behavior in many different ways, including ignoring the behavior.

The system may include a third notification from a third client device to the server that increases a first likelihood that the first variant will be transferred by the server instead of the second variant. Since the system has received the results of the first and second variants from the first and second users respectively, the system knows that the first variant will likely be more successful (e.g., the first user accepted the first variant as opposed to the second user who rejected the second variant) and will use the first variant more. This may include removing the second variant from sending to users or refining the variants based on the first variant and not the second variant.

In an embodiment, the system includes determining, at the server, a first user category to assign to the first user based on the first context determined by the first advisor task. The user category may be stored in a user profile for the first user. The system may determine variants to send to the first user based on the user profile for the first user. For example, instead of sending variants based on context information, the system may build up a user's information (e.g., multiple interactions, multiple contexts) to develop the user's profile.

In an embodiment, the system collects, before the second interaction, by the first advisor task a fourth interaction made at the first client device by the first user. The system determines by the first advisor task a third context for the fourth interaction. The first user category is based on first and second contexts determined by the first advisor task. This means that the system may consider one or more contexts when determining user categories in the system.

In an embodiment, the system identifies contexts that are different and do not contribute to the same user categorization. The system collects, before the second interaction, by the first advisor task, a fourth interaction made at the first client device by the first user. The system determines by the first advisor task a third context for the fourth interaction, where the first user category to assign to the first user is based on first context determined by the first advisor task but not the fourth context.

The system may include information on interactions by the user among different sources of information. In an embodiment, the first interaction of the system includes an interaction with the first guided task. For example, the first interaction includes selecting a content item accessible by a guided task. In this example, an advisor task receives information on this interaction. In another example, the first interaction includes an interaction with an operating system of the first client device to provide information on accesses to a file system of the client device. The system receives by the first advisor task, the first interaction made at the first client device from the operating system of the client device.

The system may include various privacy features. An example of a privacy feature of the system includes disallowing the first advisor task from directly communicating with the first guided task. This assists users in controlling their information shared with the system.

The system may include gathering metadata kept with content items to provide more insight into how to encourage user engagement with the system. In an embodiment, the system gathers metadata by the first advisor task of a first content item included with the second interaction and determines that the first variant would be beneficial when used with the first content item. For example, the system may determine it would be beneficial to store the first content item in a content item storage system accessible to a user's device over a network as well as locally on the user's computer.

In an embodiment, the system is implemented on a client-server model. This means that the system may include one or more servers, which are connected to one or more clients over a network (e.g., Internet, LAN, or other type of network). The system may be referred to as an online content management system, an online synchronized content management system, or a synchronized content management system. The servers may be controlled by a content management system, such the system provided by Dropbox Inc. In another embodiment, the servers are controlled by an organization, such as Business customers of Dropbox Inc., and used by users associated with the organization. In this embodiment, Dropbox Inc. may provide software to support features of a content management system, but allow the content items to be stored on computing devices within the organization's physical control (e.g., on servers executing, maintained, and administered by the organization).

The system may include the first advisor task and the first guided task executing as first and second applications, respectively, hosted by separate processes of an operating system executing on the first client device. The first advisor task and the first guided task may be installed on the user's computer as part of a single installation package or one application after the other (e.g., installing the first guided task then installing the first advisor task).

In an embodiment, the system receives from the first user an acceptance of the first consequence included with the first variant and presents an on-screen tutorial to the user. The tutorial is specified by the first variant and includes at least one of a video or a picture describing how to use the first featured function of the first guided task. The system may also gather information on an operating environment of the client device. The system may use this information to customize the tutorial based on the operating environment.

In an embodiment, the system includes server-side functionality to support users and variants sent to the users. The system may include sending a first variant from a server to a first client device, where the first variant includes a first featured function the first variant promotes and a first behavior used to notify users about the first featured function. The system receives from the first client device what interaction a user had with the first variant. For example, the first behavior is shown to the user and accepted, denied, or ignored by the user. When the user indicates their acceptance of the behavior, the system stores in a variant database coupled to the server a first association that the first variant was accepted by the first user. The variant database may include one or more items stored in the database, such as numerous variants, behaviors, consequences, and results for variants of the system. In alternate embodiments, this information may be stored in two or more databases. For example, variants may be stored in one database and behaviors defined in another database. Each variant may be indexed to the appropriate behavior. The system may include determining at the server that a second user on a second client device may be interested in the first featured function. The system may include, based on the first association stored in the variant database, selecting the first variant for the second user and sending the first variant to the second client device.

The system may select variants for users that have been accepted by other users. This may include sending a second variant from the server to a third client device, where the second variant includes the first featured function the second variant promotes and a second behavior, different than the first behavior, used to notify users about the first featured function. This may include receiving from the third client device at the server, that the second behavior was denied by a third user of the third client device, and storing in the variant database coupled to the server a second association that the second variant was denied by the third user, where the selecting the first variant for the second user is based on the first and second associations stored in the variant database.

The selecting the first variant for the second user may include determining to not select the second variant based on the second association stored in the variant database. This may be done by ignoring (e.g., not considering the second variant) or analyzing the second variant from its entry in the variant database but determining, based on previous results with the second variant, to not send it to further users. The previous results may include one or more previous results, used to gauge the effectiveness of variants.

The system may also include user profiles, which assist the system in determining what kind of variants a user may need. The system may assign, at the server, to the first user a first user category, the first user category determined based on the first user's interaction with the first client device. For example, the system may determine that the first user is a new user, so that they may benefit from new user tutorials of the system. The system stores in a user database the first user category with the first user's profile. Using the user profile associated with the first user, the system may select the first variant based on the user profile. Additionally, depending on how the first user interacts with the first variant, the system may determine whether to increase the likelihood the first variant is used for other user's with a similar user profile of the first user.

Example System Implementation

FIG. 1 illustrates an example system 100 in which the techniques described may be practiced according to certain embodiments. System 100 is a computer-based system. The various components of system 100 are implemented at least partially by hardware at one or more computing devices, such as one or more hardware processors executing instructions stored in one or more memories for performing various functions described herein. System 100 illustrates only one of many possible arrangements of components configured to perform the functionality described herein. Other arrangements may include fewer or different components, and the division of work between the components may vary depending on the arrangement.

A server 102 is connected over a network to clients 104 and 106. Although only two clients are shown in this figure, any number of clients may be connected to the server 102. Likewise, although only one server is shown in FIG. 1, the system may include more than one server. Different clients may connect onto different servers, and the servers may perform load balancing to ensure that server load is distributed accordingly (e.g., by number of users, by number of requests, by number of connections, by size of content items). Clients 104 and 106 represent client devices in different embodiments of the system. The system may be used with clients as shown in one of these embodiments, both of these embodiments, or in embodiments not shown in this figure. As an example, server 102 may be a server executing content management software from Dropbox, Inc.

Client 104 includes tasks 108 and 110. These tasks may be an advisor task 108 and a guided task 110. In this embodiment, the advisor task is not allowed to directly communicate to the guided task 110. The advisor task 108 receives information on interactions a user makes at the client 104 by accessing the information through an operating system 114 of client 104. The advisor task 108 may receive through the operating system 114 interaction information on other applications executing on client 104, not shown in this figure, or interaction information on the operating system 104 itself.

Client 106 includes tasks 116 and 118. These tasks may be an advisor task 116 and a guided task 118. The advisor task 116 receives information on interactions a user makes at the guided task 118. The advisor task 116 may also receive information on interactions the user makes through an operating system of client 106, not shown in this figure. Optionally, tasks 116 and 118 may be executing as part of an application 120. This application 120 may be a browser application or another application installed on the client 106.

In an embodiment, the system includes two tasks executing as part of an operating system installed on a device. The tasks may be part of a single application executing on the device, such as two tasks from a stand-alone application or two tasks hosted on a browser application. When installed as a stand-alone application, the system may receive a richer source of information about the user's behavior than when hosted on a browser. This is because browsers are often an important avenue for attackers, so access to user information on devices through a browser is often limited.

In alternative embodiments, the system includes two tasks, each executing as part of two applications executing on a user's device. Each application is hosted on the device as a separate process of an operating system of the user's device. This allows the system to make changes to a task, without affecting another task, allowing a quicker turn around if new variants need to be tested. One of the applications may be a background process executing on the user's device, so that it is hidden from the user on a task bar of the user's device. It may be installed as part of an installation package for the system. However, the user may be able to determine the second application is running by viewing a process or task manager of the system.

The server 102 includes various components. A selection component 122 accesses a variant database 123 to determine what variants to transfer to a particular client (e.g., clients 104 and 106). A profile updater component 124 accesses a user profile database 125 to update information stored about users. The profiles may include a name, sign-up source, a log noting one or more interactions with features of the system, a unique user identifier used by the system to uniquely identify a user from other users of the system, a profile categorization, or any combination of these.

A profile categorization component 126 allows the system to assign categories for profiles stored in profile database 125. The system includes with profiles for its users different profile categorizations. These assist the system in determining what kinds of variants may be most suitable for a user. As described in detail elsewhere, the system determines context information from interactions gathered from a user. Using the context from one or more interactions, the system may choose to assign the user into one or more categories. The system may also consider a sign-up source when determining a profile category for a user. As an example, a user who is referred by a photo related Website may be suitable for a photo category of the system. Table 1 shows a non-exhaustive listing of profile categories the system may support, along with information on what kind of user to categorize in each category as well as changes the system may make based on each respective category.

TABLE 1

| Categories of Users | |
|---|---|
| Category | Description of Interaction and Suitability of Variants |
| Power user | A user who is familiar with many of the features of the system and is often a heavy user of the system. The system may choose to send fewer variants to these users or select variants corresponding to newer or advanced features that they have not used yet. |
| Long absence user | A user who had signed up for the system, but has not been active with the system lately. The system may analyze user information for when they last used the system (e.g., last time logged in, last time of interaction with the system, or other) and determine what features may be of interest to the user now. This may include a feature introduced to the system since they last used the system or updates to features they previously used. |
| Novice user | A user who has been using the system, but has not explored more advanced features of the system. The system may determine which features the user has been using and suggest new features that may be useful to the user. |
| New user of system | A user who has recently signed up to use the system. The system may load more variants explaining basic features of the system. |

TABLE 1-continued

Categories of Users

| Category | Description of Interaction and Suitability of Variants |
|---|---|
| New user of application | A user who has recently installed an application including one or more guided tasks onto their device. The system may provide more variants on how to use the specific guided task. |
| Last active | A user who has last used the online service based on a certain amount of time (e.g., a day, a week, a month, or other length of time). The system may include more information to let them catch up with changes in the system, based on the amount of time they last used the service. |
| Mobile user | A user who used the online service from a mobile computing device (e.g., a cell phone) in the past (e.g., 28 days). The system may provide variants on how to access content items on their other devices. |
| Client user | A user who used the online service from a desktop computing device (e.g., a laptop computer) in the past (e.g., 28 days). The system may provide variants on how to access content items on other devices. |
| Web user | A user who accessed the online service using a web browser in the past (e.g., 28 days). The system may provide variants on how to access content items using different methods. This may include accessing content items on different devices, different applications than the web browser, or other methods to interact with the system. |
| Photo | A user who uploaded digital photos to the online service or that edited one or more digital photos stored with the online service in the past (e.g., 28 days). The system may provide variants on how the user can share photos, access photos elsewhere, or synchronize photos automatically). |
| Business | A user who uploaded work content items to the online service or that edited one or more work content items hosted with the online service in the past (e.g., 28 days). Here, a work content item may be defined or detected according to various different criteria such as, for example, by file type, content item name, and/or content item content. The system may provide variants on upgrading to a higher level of service, how to access content items on other devices or through different applications, how to share content items with coworkers, or information on other functionality of the system. |

A machine learning component 128 allows the system to learn from choices made by the selection component 122. For example, the variant database 123 may include information on various successes (e.g., acceptance of a variant by a user) or various failures (e.g., ignoring the variant by a user, denying of a variant by a user) of variants used in the system. The system determines which variants are strongest, so that these variants may be used more often and, alternatively, reducing the use of weaker variants. The system may automatically makes these changes or may provide a report showing the differences in variant performance. For example, after collecting ten or more denials of a variant, the system may choose to promote another similar variant. As another example, after collecting ten or more acceptances of a variant, the system may choose to promote the variant over other similar variants.

Databases 123 and 125 may be any suitable storage device such as one or more hard disk drives, memories, or any other electronic digital data recording device configured to store data. Although these databases are each depicted as single device databases in FIG. 1, each database may span multiple devices located in one or more physical locations. For example, user profile database 125 may be stored on one or more devices located at one or more data warehouses. Additionally, in one embodiment, variant database 123 and user profile database 125 may be divided into different databases. For example, variant database 123 may include efficacy information in a first database and behaviors in another database.

Process Overview

Some specific flows for implementing a technique of an embodiment are presented below, but it should be understood that embodiments are not limited to the specific flows and steps presented. A flow of another embodiment may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular application or based on the data.

Figure 2:
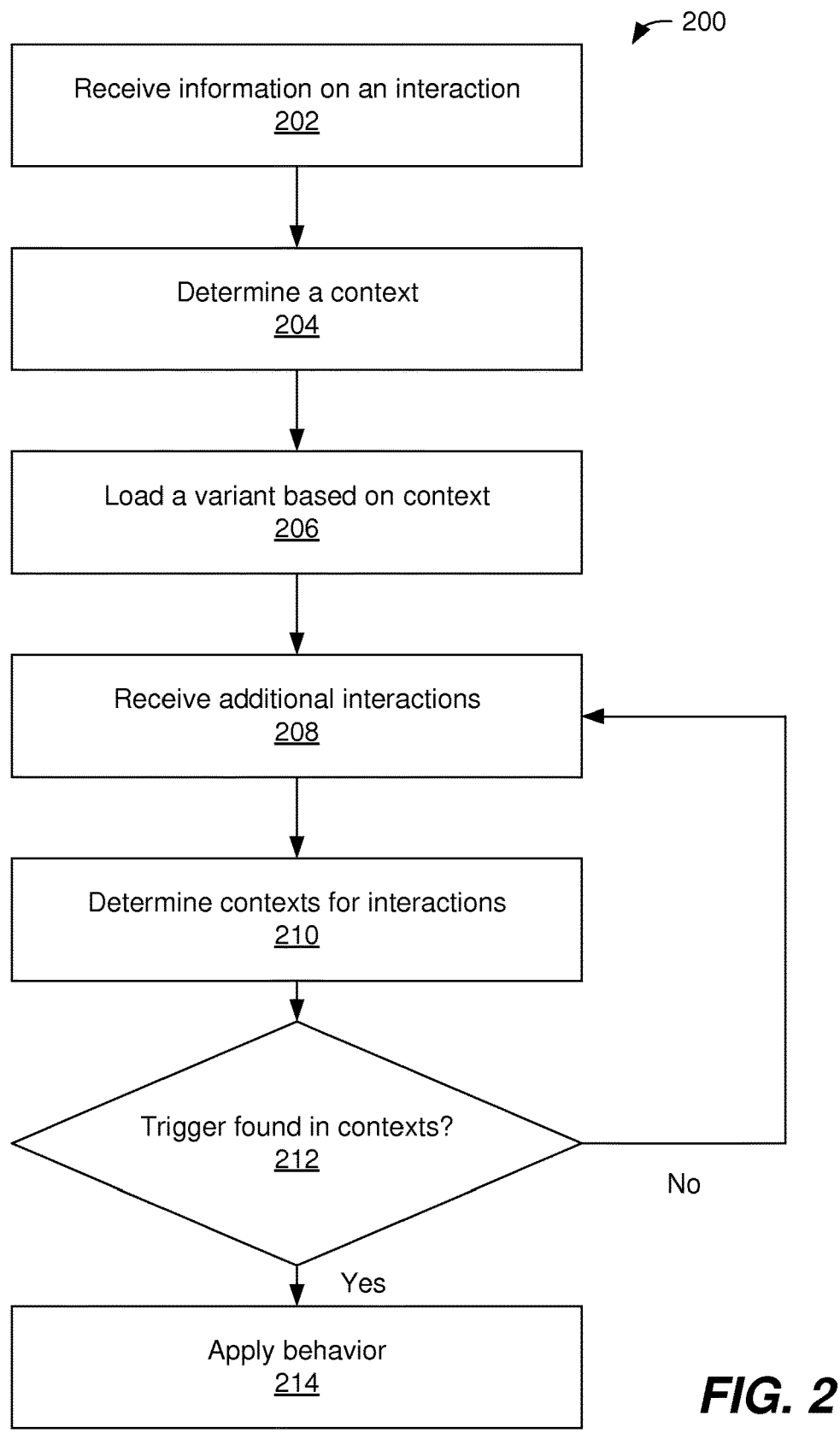
FIG. 2 is a flowchart that depicts an example process for an adaptive contextual learning tool.

FIG. 2 is a flowchart that depicts an example process 200 for an adaptive contextual learning tool. In a step 202, the system receives information on an interaction made by a first user at a device. The information may include not only what was done by the first user, but associated metadata with the interaction.

In a step 204, the system determines a context for the interaction. The context allows the system to understand what the interaction means according to the system. For example, if the system is a content management system, attaching a content item to an e-mail has a context of sharing a content item. The system may use this context to provide additional features that may be useful to the user.

In an embodiment, a context of an interaction is determined by a task executing at a user's device. This allows the system to make determinations on context and return a variant quickly. The task may send this context information to the server. In an alternate embodiment, a context of an interaction is determined by a task executing at a server. Information on the interaction is supplied to the server over a network, where the system determines the context of the interaction. The context may then be returned to the user's device or stored at the server. If stored at the server, the system associates the context with the user, so that the context may be used by the system in subsequent actions (e.g., determining variants, executing variants, reporting on interactions, or other).

In a step 206, the system loads a variant based on the context. A variant is an experiment or one of many different methods to get feedback from users on how they want to use the system. Variants may be loaded and offloaded from the user's device quickly, based on various factors of the system. Some factors include whether a variant has proven successful in other situations, whether a variant matches a profile categorization of the user, whether a variant matches a context of the user, and other factors.

In a step 208, the system receives additional interactions from the user. In a step 210, the system determines contexts for the additional interactions.

In a step 212, the system determines whether any of the interactions from step 208 triggers the loaded variant. The interactions may be analyzed according to the contexts. If the trigger is not found, the flow returns to step 210 to wait for additional interactions. If the trigger is found in a step 214, the system applies a behavior stored with the variant. The behavior may include a visual indication to the user on whether they would like to learn about a certain function enabled by a task.

In various embodiments, the system may monitor for triggers for one or more variants on a user's device at a single time. This means that, for different contexts, the system may present one or more variants that are suitable to the user based on their interactions. For example, a user's device includes a first variant relating to content item sharing and another variant relating to saving content items online. If the system receives an interaction to save a content item locally on the user's device, the system may present the variant related to saving content items online and continue to monitor for the first variant.

Figure 3:
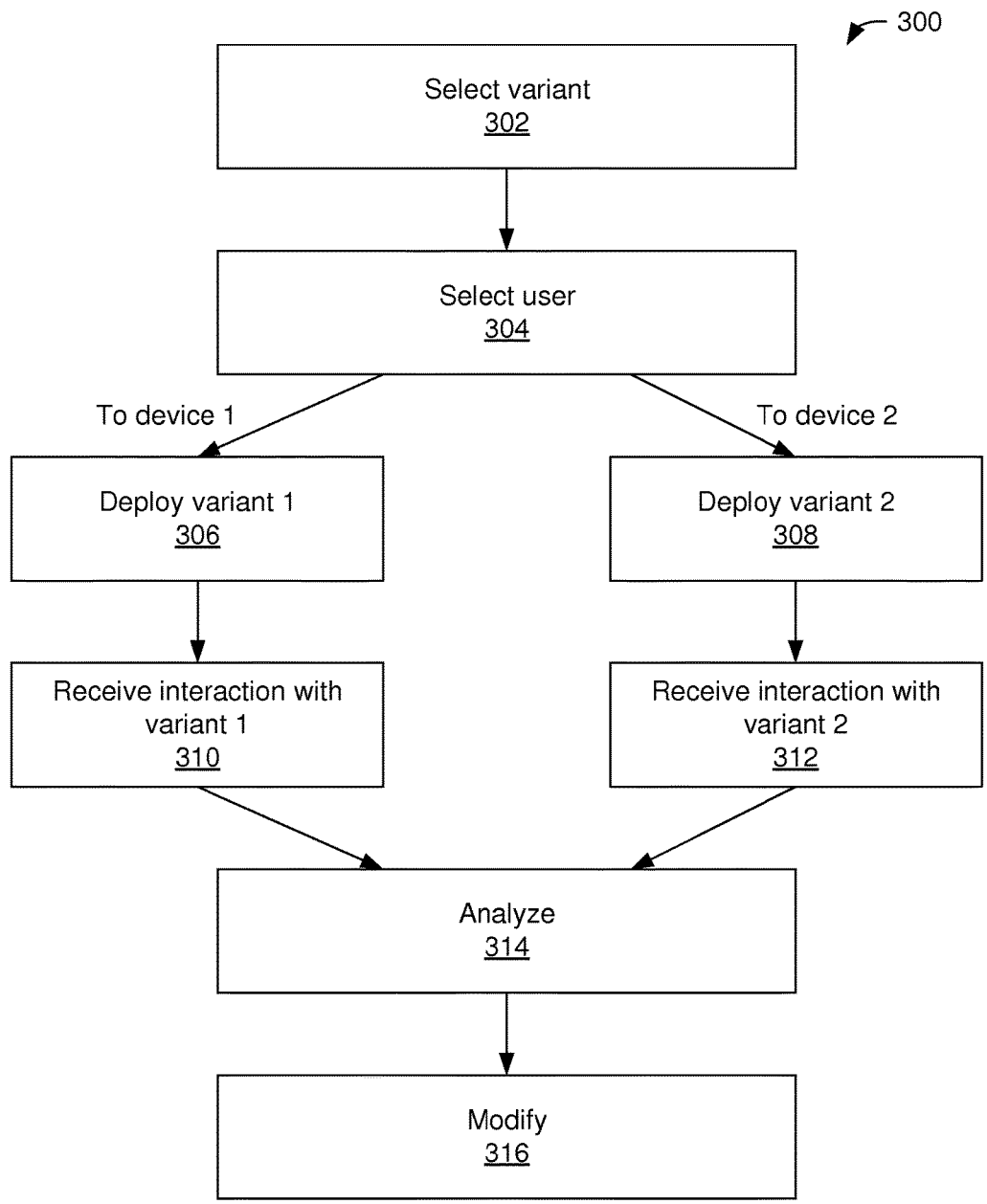
FIG. 3 is a flowchart that depicts an example process for machine learning in an adaptive contextual learning tool.

FIG. 3 is a flowchart that depicts an example process 300 for machine learning in an adaptive contextual learning tool. In a step 302, the system selects variants to send to devices connected to the system. This may occur asynchronously, meaning the devices do not need to be connected to the system at the same time. For example, a first variant is selected to be executed on a first device at a first time and a second variant is selected to be executed on a second device at a second time. In a step 304, the system selects for each device a variant. Variants 1 and 2 are selected and may include the same goal and featured function. In this example, the system includes devices 1 and 2, but the system may be used with any number of devices as well as any number of variants, not shown here.

In steps 306 and 308, the variants are deployed to devices 1 and 2, respectively. The variants do not need to be deployed at the same time to devices 1 and 2. The deployments to multiple devices may be made near in time so that a comparison of the variants can be made, but this is not required by the system. In steps 310 and 312, the system receives information on variants 1 and 2. This includes whether each variant was accepted or denied by users at devices 1 and 2. The information may also include any associated information requested by the system (e.g., length of time before interaction with each variant occurred, metadata on interactions, etc.).

In a step 314, the system analyzes the received information. This may include comparing results among the different variants. Some examples of information that may be considered include time a user hovers over a behavior before taking an action, time shown before dismissal of behavior, time shown before accepting of behavior, or other information.

In a step 316, the system makes changes according to the information. This may include sending out reports detailing the analysis or promoting (or demoting) variants based on the returned results. The system may also make changes to variants based on the results.

In an embodiment, the system includes an online service for content item hosting. The online service includes various features, such as storage of content items on a server, content item synchronization, client software to facilitate online content item storage, web-based access, plug-ins, and other features. As an example, the client software allows users to select a folder on their computers. This folder is part of a content item system controlled and managed by an operating system executing on the user's computers and also synchronized with the online service so that content items in the folder appear on other devices. This may allow content items in the folder to be stored in at least two locations: (1) locally, at the computer a user is at and (2) at a server, accessible via a network. The online service may enforce privacy controls to content items, so that the content items are by default prevented from access by other users. An example of a content management system includes Dropbox, Inc. of San Francisco, Calif.

The system may allow users to create a special folder locally on their devices (e.g., personal computer, tablet, smartphone, or other computing devices), which the system then synchronizes with a version of the folder on a server. This includes sending from the user's various devices to the system's servers content items stored in the special folder. To the user, the special folder local on their devices and the version of the folder stored on the server appear to be the same. That is, the folders contain the same contents regardless of which computing device is used to view it. Files placed in this folder are also accessible via the system's website (e.g., www.dropbox.com) and mobile apps.

Figure 4:
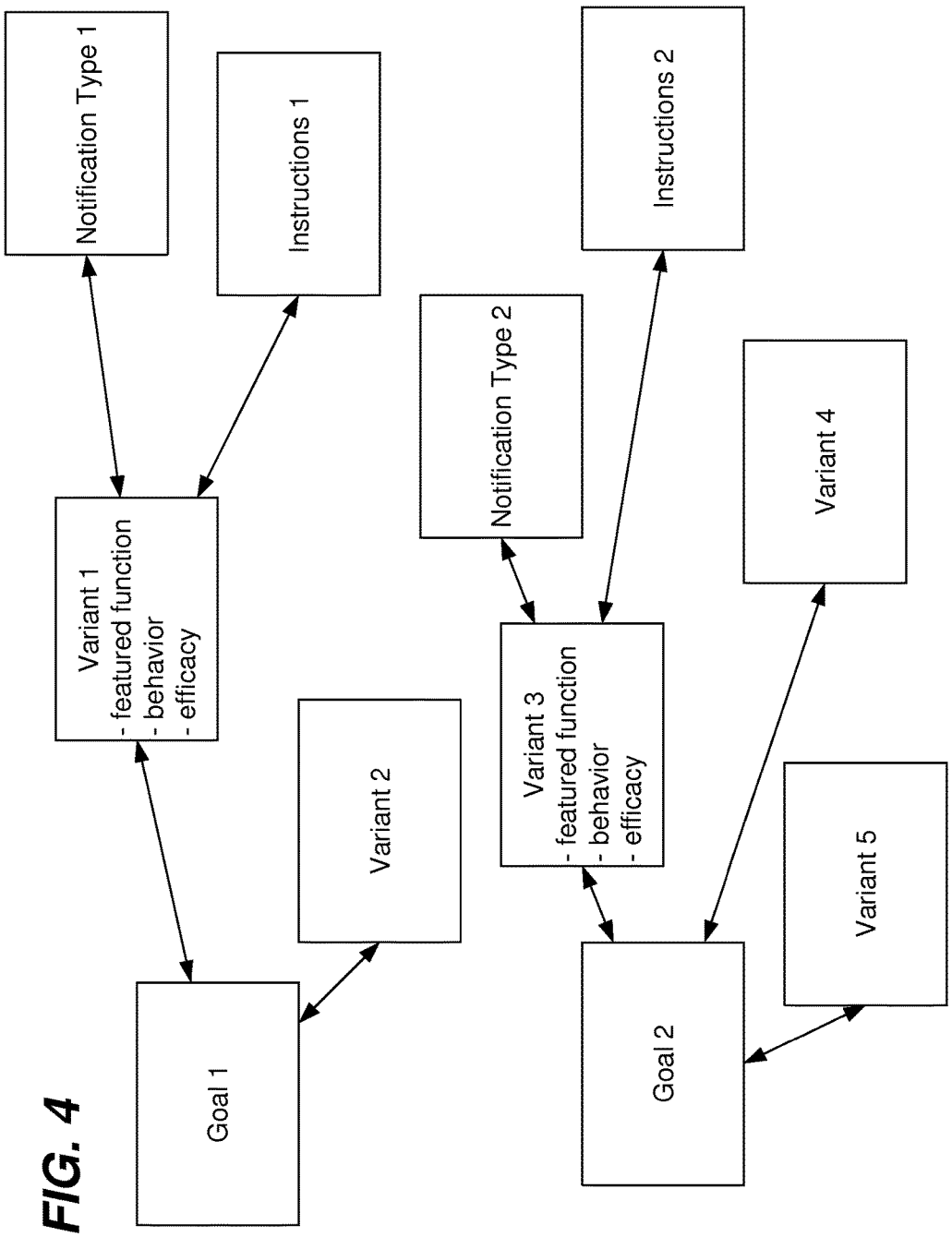
FIG. 4 shows an example of relationships between different data elements for various goals in the system, in an embodiment.

FIG. 4 shows an example of relationships between different data elements for various goals in the system, in an embodiment. These data elements may be stored in variant database 123 of FIG. 1 or other suitable methods. For example, different databases may be used to store different parts of the data elements as shown in FIG. 4. As an example, efficacy information may be stored in a separate database from other variant information, and include a variant identifier that allows the efficacy information to be indexed to its respective variant.

Goals 1 and 2 are shown in FIG. 4. A goal in the system represents a purpose a user may have, which may be accomplished using features of the system. This may be a goal that the user is unaware the system may assist the user with. Goals may be dependent on what kind of guided task is used by the system at a given time. For example, a guided task for a content management system will have goals on how users can use, share, manipulate their content, and other goals. As another example, an online reading service will have goals on how users can find new books they may want to read, how to share books they have, and other goals.

Goals may have different variants and different number of variants attached to them. Goal 1 includes variants 1 and 2. Variants are experiments used to teach users different ways to achieve their goals in the system. A variant may include an associated featured function, behavior, and efficacy measure. The featured function is a function that may assist the user in achieving its associated goal. A behavior includes a notification type (e.g., notification type 1) and instructions (e.g., instructions 1). The notification type includes a method used by the system to attract the user's attention and to provide a brief explanation of how the featured function may assist the user in their goal. The instructions include a method used by the system to teach the user how to access a featured function. The efficacy measure includes information on how successful a variant is.

The system includes different notification types for different variants. The system produces a notification based on different notification types maintained by the system. Some components of a notification type may include a graphical element and a textual element. The graphical element may include one or more buttons (or icons) allowing a user to accept or dismiss an associated notification, a picture that represents a featured function of an associated notification, a video, or an animated graphic. For example, for a function to move a content item into a content management system, a picture showing a graphical cloud and content item may be used. A notification may also only include a graphical element or only a textual element.

The textual element may include a description of the feature and a reason why a user should try the feature. For example, for a function to move a content item into a content management system, the system may include "Want to have access from anywhere? Move to your online folder!" As another example for a function to move a content item into a content management system, the system may include "Hey you can now do this with your files!" as a textual element in conjunction with a graphical element, such as a graphical cloud and content item.

The system may use a variety of notification types to display notifications to the user. Some examples of notification types include a system tray pop-up, customized message according to the system's template, system toast message, or other types.

In an embodiment, the system learns from previous interactions a user has had by analyzing metadata collected from previous interactions. Collecting metadata is discussed in detail elsewhere in this application. If the system has determined by analyzing metadata of previous interactions that a particular action occurs after an initial interaction, when a similar interaction to the initial interaction occurs, the system may suggest to the user that they may like to perform the particular action again. For example, if the system knows based on collected metadata that documents that were previously created or modified are sent to a particular contact of a user (e.g., boss, family member, or other), the system will remind the user whether they need to do so again when a similar interaction occurs with those documents later or with similar documents.

Instructions may be in text, video, picture or a combination of these. The picture format may include a series of pictures, to demonstrate step-by-step usage of a feature. The series of pictures may be automatically incremented (e.g., by a timed interval, varying depending on difficulty of steps to take, linked to the user performing the action described by the picture, or other) or manually by the user (e.g., user needs to click to see next picture).

In an embodiment, instructions provided by the system are sensitive to different operating environments of a user's device. Some examples of environments include an operating system or applications of the user's device. For example, if a user is connected to the system using a Windows® computer, a video shown will reflect the Windows operating system interface, making it easier for the user to understand how to find and use the feature. As another example, if a user is saving a document file edited in Microsoft Word®, a picture shown will reflect the Microsoft Word interface. Windows and Microsoft Word are registered trademarks of the Microsoft Corporation.

An efficacy metric may be used by the system to determine a particular variant's success. The system supports various methods for judging the success of a variant. Some examples include time a user hovers over a behavior before taking an action, time shown before dismissal of behavior, or time shown before accepting of behavior.

Although only a limited number of each data element is shown in FIG. 4, there may be more of each data element than what is shown in the figure. For example, the system may include more than two goals or more variants for goals 1 and 2. Also, although variants 2, 4, and 5 are not shown with corresponding notification types or instructions, they may include these data elements.

In an embodiment, the system includes privacy controls. The user can use the privacy controls to grant different levels of information access to the system. Some examples of computer resources the system may be allowed to access include a network connection, root access to the computer, file access, metadata of information accessible by the system, access to logs kept by the computer, access to operations of one or more applications executing on the computer, or any combination of these. As an example, a user may choose to allow the system root access but not to a network connection of the system. This allows the user to adjust what kind of information is accessed by the system (e.g., at a low level with root access) but disallow sharing of the information (e.g., the information is retained at the computing device, not sharable over the Internet).

The system may use different approaches to protecting user privacy. The system may use a permission based system to ensure privacy. With this approach, the system will request access to information on a user's device, before collecting information. This will offer the user a granular level of control over their devices and information. The system may use an opt-out based system to ensure privacy. With this approach, the system will gather information on a user's device, but allows the user to adjust what information the system is allowed to access.

In an embodiment, the system does not explicitly use demographic information of users when considering what variants to select. Although the system may assign a user to a specific profile (e.g., heavy use of service for specific types of music or photo heavy user) that may give an indication about demographic information of the user, the system does not use the information as demographic information when determining variants to be used.

In an embodiment, the system includes an "annoyance" indicator for variants shown to a user. This is used by the system to make sure users are comfortable with the system, without providing too much information so as to cause the user to stop using the system. This may be used in conjunction with the efficacy metric described elsewhere as part of the system's machine learning features. Some examples of what lead to user annoyance include: using too many behaviors, using a behavior too many times, showing a behavior on a screen for too long, stealing focus on the user's device, or other factors. The system may use a variety of methods to reduce the annoyance indicator. For example, the system may limit how many behaviors are shown at a given time. This may prevent a new variant's behaviors from appearing when a variant behavior is already shown, even if it matches an interaction. As another example, the system may include an automatic dismissal of a variant's behavior based on time. If a user has not provided feedback to a variant for a given amount of time (e.g., 5 seconds, 7 seconds, 9 seconds, 10 seconds, or more), the system can dismiss the variant's behavior automatically. In an embodiment, the system includes an option to indicate that a variant should be labeled as "Don't remind me" or an equivalent phrase. Variants where a user has selected this option are not shown to the user again. This may be accomplished in the system using a variety of methods, such as a flag associated with each variant that when set, indicates said variant is not to be displayed again, or by increasing the annoyance indicator for said variant making it unlikely that said variant will appear again.

Examples of various use cases of the system follow below. These examples are used for illustrative purposes, and other similar use cases may include fewer, greater, or changed steps as described in each of the use cases below.

Use Case 1

---

User interaction: User saves a content item.
Goal: Encourage use of a "1-click" feature to move content items into a content management system.
Feature: A user may use one-click of their mouse (e.g., a left-click on a button provided in a notification, without leaving the file) to transfer their content items.
Notification: Message asking user if they want to "Keep this content item safe online."
Instructions: After the user has used the "1-click" feature:

---

(1) Show opening a content item explorer and highlight content item user has saved.
(2) Show user a "Confirmation" or "Follow-on" notification.

-continued (3a) Confirmation notification shows "This content item was added online!"
(3b) Follow-on notification shows "Share this content item!" Another variant is used with the goal to encourage use of sharing content items added in online storage.

Use Case 2

User interaction: User has added content items to their content management system.
Goal: Get a user to take actions beyond adding content items.
Feature: A user may share content items or a folder in their online storage.
Notification: Message asking user "Congratulations, your content items are safe, now right click to share."
Instructions: Show an example flow with pictures of:

(1) Find recent content items with online system tray menu.
(2) Selecting one or more recent content items and recipients to share with.

Use Case 3

User interaction: User signs up for a content management system and installs client application.
Goal: Give users a quick overview of how online storage can be useful.
Feature: Help users add their first content items to the content management system.
Notification: Started automatically while installing client application.
Instructions: Show an example flow with pictures of:

(1) "This special folder is on your computer. It works just like your Documents or Photos folder, with one special superpower."
(2) "Content items you put in your special folder are automatically backed up to our website. So your stuff is safe even if something happens to your computer."
(3) "Stuff you put in your special folder is private by default. You choose what to share, and with whom."
(4) "Add your first content items."

Use Case 4

User interaction: User signs up for a content management system and installs client application.
Goal: Allow the system access to information on content item use on the client so that more advanced features of the system are available for use.
Feature: Scanning of one or more folders on the client to enable advanced features.
Notification: Message asking user "Do you allow permission to watch folders on your device?"
Instructions: Show an example flow with pictures of:

(1) If deny access, the system monitor will not monitor folders.
(2) If allows access, the system shows how the system will provide additional features based on watched folders.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
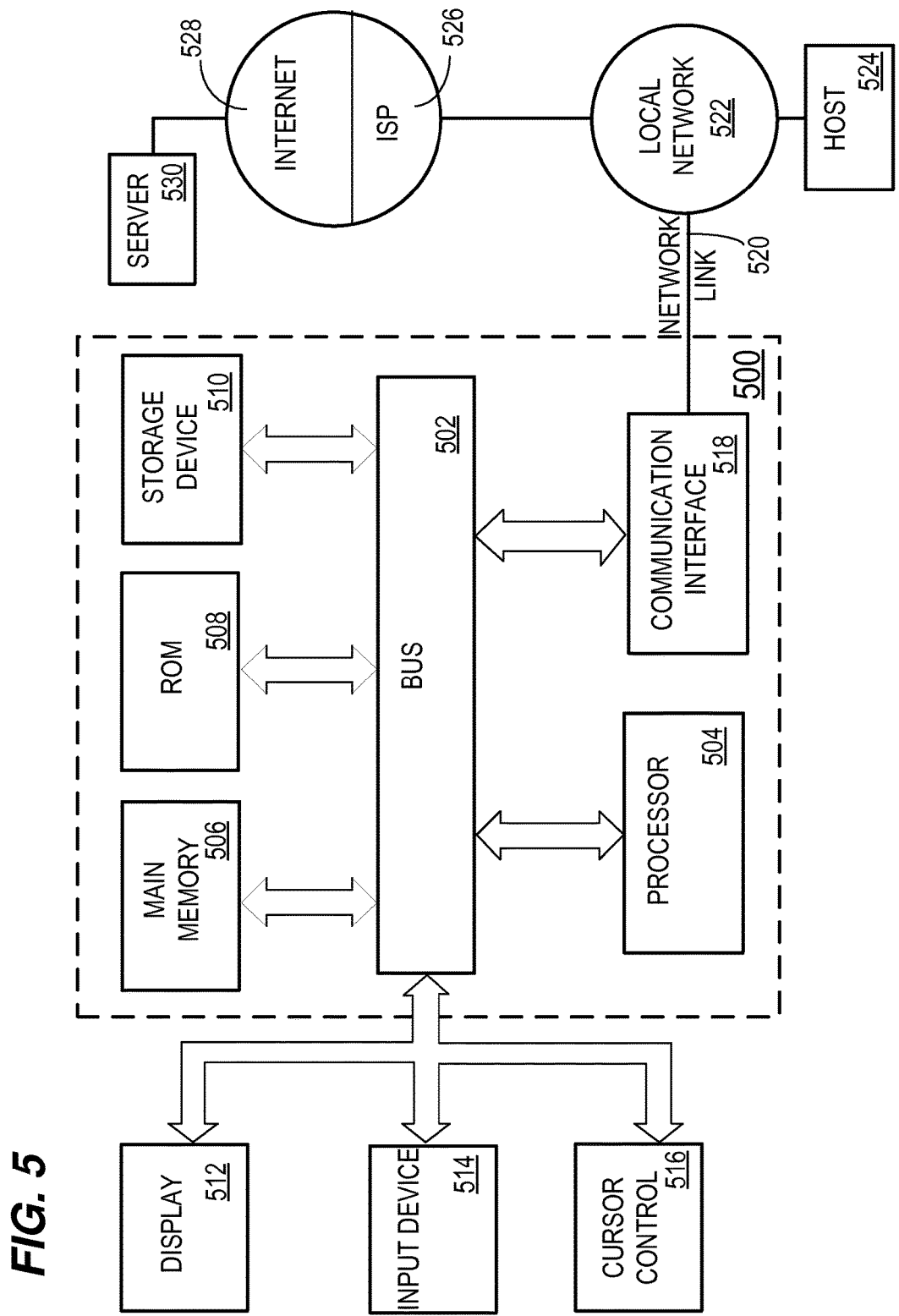
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

Figure 6:
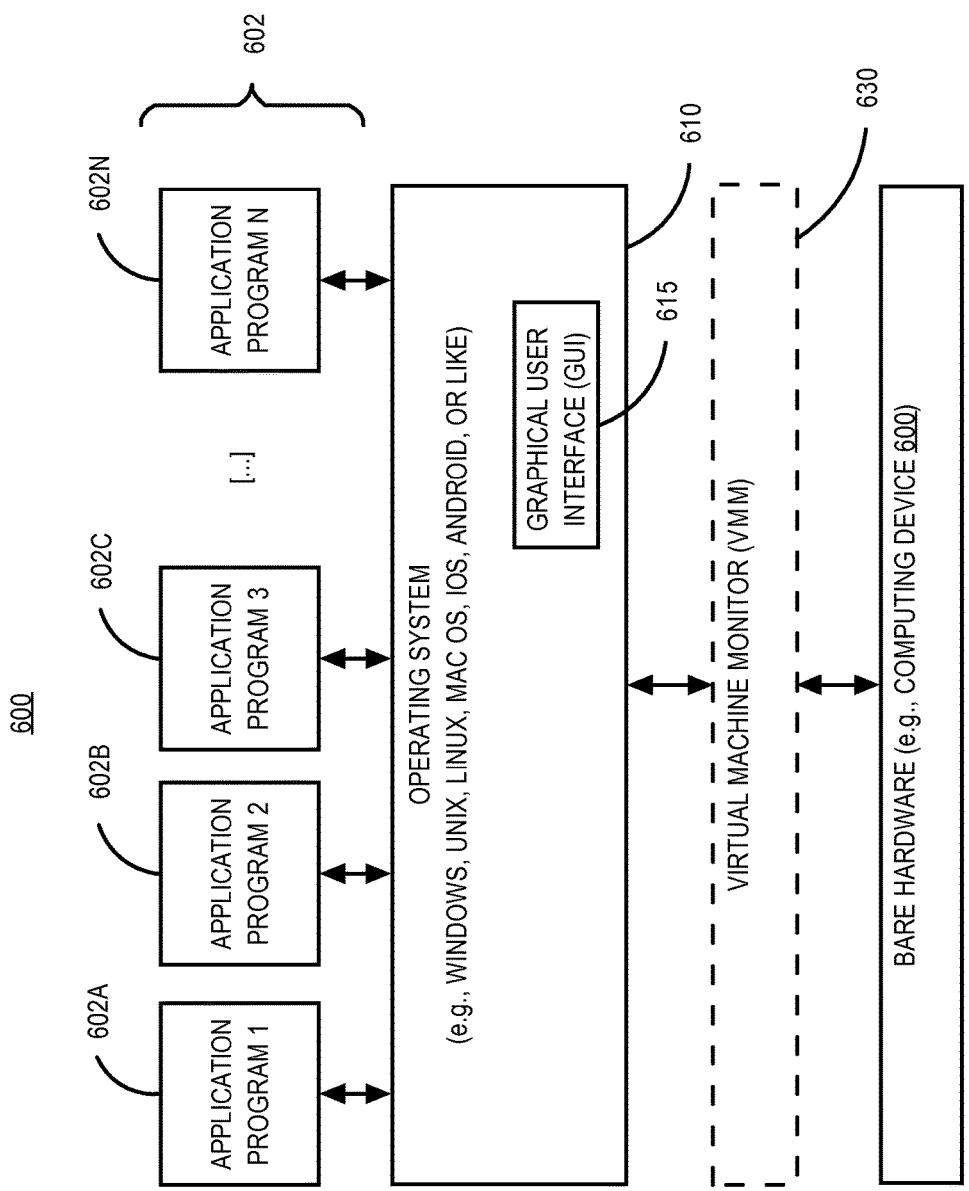
FIG. 6 is a block diagram of a software system that may be employed for controlling the operation of the example computing device according to some embodiments of the present invention.

FIG. 6 is a block diagram of a software system 600 that may be employed for controlling the operation of the example computing device 500 of FIG. 5 according to some embodiments of the present invention. As shown, a computer software system 600 is provided for directing the operation of the computing device 500. Software system 600, which may be stored in system memory (RAM) 506 and on fixed storage (e.g., hard disk) 510, includes a kernel or operating system (OS) 610. The OS 610 manages low-level aspects of computer operation, including managing execution of processes, memory allocation, file input and output (I/O), and device I/O. One or more application programs, such as client application software or "programs" 602 (e.g., 602A, 602B, 602C . . . 602N) may be "loaded" (i.e., transferred from fixed storage 510 into memory 506) for execution by the system 600. The applications or other software intended for use on the device 500 may also be stored as a set of downloadable computer-executable instructions, for example, for downloading and installation from an Internet location (e.g., Web server).

Software system 600 may include a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or client application module(s) 602. The GUI 615 also serves to display the results of operation from the OS 610 and application(s) 602, whereupon the user may supply additional inputs or terminate the session (e.g., log off).

The OS 610 can execute directly on the bare hardware (e.g., processor(s) 504) 620 of device 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the device 500.

VMM 630 instantiates and runs virtual machine instances ("guest machines"). Each guest machine comprises a "guest" operating system, such as OS 610, and one or more applications, such as applications 602, designed to execute on the guest operating system. The VMM 630 presents the guest operating systems with a virtual operating platform and manages the execution of the guest operating systems. In some instances, the VMM 630 may allow a guest operating system to run as through it is running on the bare hardware 620 of the device 500 directly. In these instances, the same version of the guest operating system configured to execute on the bare hardware 504 directly may also be able to execute on VMM 630 without modification or reconfiguration. In other words, VMM 630 may provide full hardware and CPU virtualization to a guest operating system in some instances. In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

The above-described computer hardware and software is presented for purpose of illustrating the basic underlying computer components that may be employed for implementing some embodiments of the present invention. Embodiments of the present invention, however, are not necessarily limited to any particular computing environment or computing device configuration. Instead, the embodiments may be implemented in any type of system architecture or processing environment capable of supporting the embodiments as presented in detail above.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method performed by one or more computing devices, the one or more computing devices comprising one or more processors and memory, the method comprising:
   detecting, by a first advisor task executing on a first client device, a first interaction made at the first client device by a first user;
   wherein the first interaction by the first user is with an application executing at the first client device;
   determining, by the first advisor task, a first context for the first interaction;
   wherein the first context includes metadata about the first interaction;
   based on the first context, identifying a first featured function of the application that is usable by the first user to achieve a determined goal of the first user in using the application;
   wherein the determined goal of the first user in using the application is determined based at least in part on the first context;
   receiving by the first client device from a server, a first variant used to promote usage of the first featured function to achieve the determined goal of the first user in using the application;
   wherein the first variant is one of a plurality of available variants for promoting usage of the first featured function to achieve the determined goal of the first user in using the application;
   wherein each variant of the plurality of available variants for promoting usage of the first featured function to achieve the determined goal of the first user in using the application includes an executable behavior configured to notify the first user about using the first featured function to achieve the determined goal of the first user in using the application;
   wherein each of the plurality of available variants includes a different executable behavior including a different type of notification for notifying the first user about using the first featured function to achieve the determined goal of the first user in using the application;
   wherein the first variant is selected to promote usage of the first featured function to achieve the determined goal of the first user in using the application, from among the plurality of available variants for promoting usage of the first featured function to achieve the determined goal of the first user in using the application, based on an efficacy metric that reflects an effectiveness of the first variant in promoting usage of the first featured function to achieve the determined goal; and
   executing the executable behavior of the first variant at the first client device.

2. The method of claim 1 further comprising:
   receiving, by the first advisor task after the first interaction, a second interaction made at the first client device by the first user; and
   determining by the first advisor task a second context for the second interaction.

3. The method of claim 2, wherein the executable behavior is a first executable behavior, the method further comprising:
   detecting, by a second advisor task executing on a second client device, a third interaction made at the second client device;
   determining, by the second advisor task, a second context for the third interaction, wherein the first and second contexts are a same context;
   identifying the first featured function of a second guided task based on the second context determined by the second advisor task;
   receiving by the second client device from the server, a second variant used to promote usage of the first featured function, wherein the second variant includes a second executable behavior;
   receiving, by the second advisor task after the third interaction, a fourth interaction made at the second client device;
   determining by the second advisor task a fourth context for the fourth interaction; and
   executing the second executable behavior at the second client device defined by the second variant.

4. The method of claim 3 further comprising:
   determining, based on the first executable behavior executing on the first client device, a first acceptance of the first variant;
   executing a first consequence, defined by the first variant, at the first client device;
   determining based on the second executable behavior executing on the second client device a first rejection of the second variant; and
   for a third client device, increasing a first likelihood that the first variant will be received by the third client device instead of the second variant.

5. The method of claim 3 further comprising:
   collecting, by the first advisor task before the second interaction, a fourth interaction made at the first client device by the first user; and
   determining by the first advisor task a third context for the fourth interaction, wherein the third context corresponds to a different user category than a user category corresponding to the first and second contexts.

6. The method of claim 3 further comprising:
   collecting, by the first advisor task before the second interaction, a fourth interaction made at the first client device by the first user; and
   determining by the first advisor task a third context for the fourth interaction, wherein the first user corresponds to a first user category based on the first context, but not with the third context.

7. The method of claim 1 further comprising:
   receiving, by the first advisor task, from an operating system of the first client device information, on accesses to a file system of the first client device; and
   receiving, by the first advisor task, the first interaction made at the first client device from the operating system of the first client device.

8. The method of claim 1 wherein the first advisor task is disallowed from directly communicating with the application.

9. The method of claim 1 wherein the application comprises a link to an online content management system.

10. The method of claim 1 wherein the first advisor task and the application execute as first and second applications, respectively, hosted by separate processes of an operating system executing on the first client device.

11. The method of claim 1 further comprising:
presenting an on-screen tutorial specified by the first variant at the first client device, wherein the on-screen tutorial comprises at least one of a video or a picture describing how to use the first featured function of the application.

12. The method of claim 11 further comprising:
gathering, by the first advisor task, information on an operating environment of the first client device;
sending the information on the operating environment to the server; and
receiving from the server the on-screen tutorial customized based on the operating environment of the first client device and including a representation of the operating environment on the at least one of the picture or video.

13. The method of claim 1 wherein the first interaction comprises executing the application on the first client device.

14. A method performed by one or more computing devices, the one or more computing devices comprising one or more processors and memory, the method comprising:
sending a first variant from a server to a first client device, wherein the first variant promotes usage of a first featured function of an application and includes a first executable behavior used to notify a first user about the first featured function;
wherein the first variant is one of a plurality of available variants, each variant of the plurality of available variants including a different executable behavior including a different type of notification for notifying the first user about using the first featured function to achieve a determined goal of the first user in using the application;
wherein the first variant is selected from among the plurality of available variants based on an efficacy metric that reflects an effectiveness of the first variant in promoting usage of the first featured function to achieve the determined goal of the first user in using the application;
receiving from the first client device at the server, that the first executable behavior was accepted by the first user of the first client device;
storing in a variant database coupled to the server a first association that the first variant was accepted by the first user;
determining at the server that a second user on a second client device may be interested in the first featured function;
based on the first association stored in the variant database, selecting the first variant for the second user; and
sending the first variant to the second client device.

15. The method of claim 14 further comprising:
sending a second variant from the server to a third client device, wherein the second variant includes the first featured function the second variant promotes and a second behavior, different than the first executable behavior, used to notify users about the first featured function;
receiving from the third client device at the server, that the second behavior was denied by a third user of the third client device; and
storing in the variant database coupled to the server a second association that the second variant was denied by the third user, wherein the selecting the first variant for the second user is based on the first and second associations stored in the variant database.

16. The method of claim 15 wherein the selecting the first variant for the second user further comprises determining to not select the second variant based on the second association stored in the variant database.

17. The method of claim 15 further comprising:
assigning, at the server, to the first user, a first user category, the first user category determined based on an interaction by the first user with the first client device;
storing, by the server, in a user database the first user category with a profile of the first user;
determining that the first variant is associated with the profile of the first user; and
selecting the first variant for the first user based on the profile of the first user.

18. A system comprising:
one or more processors;
one or more computer-readable media storing instructions which, when executed by the one or more processors, cause:
detecting, by a first advisor task executing on a first client device, a first interaction made at the first client device by a first user;
wherein the first interaction by the first user is with an application executing at the first client device;
determining, by the first advisor task, a first context for the first interaction;
wherein the first context includes metadata about the first interaction;
based on the first context, identifying a first featured function of the application that is usable by the first user to achieve a determined goal of the first user in using the application;
wherein the determined goal of the first user in using the application is determined based at least in part on the first context;
receiving by the first client device from a server, a first variant used to promote usage of the first featured function to achieve the determined goal of the first user in using the application;
wherein the first variant is one of a plurality of available variants for promoting usage of the first featured function to achieve the determined goal of the first user in using the application;
wherein each variant of the plurality of available variants for promoting usage of the first featured function to achieve the determined goal of the first user in using the application includes an executable behavior configured to notify the first user about using the first featured function to achieve the determined goal of the first user in using the application;
wherein each of the plurality of available variants includes a different executable behavior including a different type of notification for notifying the first user about using the first featured function to achieve the determined goal of the first user in using the application;
wherein the first variant is selected to promote usage of the first featured function to achieve the determined goal of the first user in using the application, from among the plurality of available variants for promoting usage of the first featured function to achieve the determined goal of the first user in using the application, based on an efficacy metric that reflects an effectiveness of the first variant in promoting usage of the first featured function to achieve the determined goal; and executing the executable behavior of the first variant at the first client device.

19. The system of claim 18 wherein the executable behavior is a first executable behavior, the one or more computer-readable media further comprising instructions which, when executed by the one or more processors, cause:
receiving, by the first advisor task after the first interaction, a second interaction made at the first client device by the first user;
determining by the first advisor task a second context for the second interaction;
detecting, by a second advisor task executing on a second client device, a third interaction made at the second client device by a second user;
determining, by the second advisor task, a second context for the third interaction, wherein the first and second contexts are a same context;
identifying the first featured function of a second guided task based on the second context determined by the second advisor task, for the second user;
receiving by the second client device from the server, a second variant used to promote usage of the first featured function, wherein the second variant includes a second executable behavior used to notify the second user about the first featured function;
receiving, by the second advisor task after the third interaction, a fourth interaction made at the second client device by the second user;
determining by the second advisor task a fourth context for the fourth interaction; and
executing the second executable behavior at the second client device defined by the second variant.

20. The system of claim 19 the one or more computer-readable media further comprising instructions which, when executed by the one or more processors, cause:
determining, based on the first executable behavior executing on the first client device, a first acceptance of the first variant;
executing a first consequence, defined by the first variant, at the first client device;
determining based on the second executable behavior executing on the second client device a first rejection of the second variant; and
for a third client device, increasing a first likelihood that the first variant will be received by the third client device instead of the second variant.

21. The system of claim 19 the one or more computer-readable media further comprising instructions which, when executed by the one or more processors, cause:
collecting, by the first advisor task before the second interaction, a fourth interaction made at the first client device by the first user; and
determining by the first advisor task a third context for the fourth interaction, wherein the third context corresponds to a different user category than a user category corresponding to the first and second contexts.

22. The system of claim 19 the one or more computer-readable media further comprising instructions which, when executed by the one or more processors, cause:
collecting, by the first advisor task before the second interaction, a fourth interaction made at the first client device by the first user; and
determining by the first advisor task a third context for the fourth interaction, wherein the first user corresponds to a first user category based on the first context, but not with the third context.

23. The method of claim 1, wherein the different type of notification of the first variant for notifying a user about using the first featured function is a pop-up notification; and wherein executing the executable behavior of the first variant causes a non-modal notification about using the first featured function to achieve the determined goal of the first user to be displayed at the first client device.

24. The method of claim 23, wherein the pop-up notification is a toast notification provided by an operating system of the first client device.

25. The method of claim 1, wherein the first variant is selected to promote usage of the first featured function to achieve the determined goal of the first user in using the application, from among the plurality of available variants for promoting usage of the first featured function to achieve the determined goal of the first user in using the application, based on both: (a) the efficacy metric that reflects an effectiveness of the first variant in promoting usage of the first featured function to achieve the determined goal, and (b) a preference for the first variant according to a user profile of the first user.

26. The system of claim 18, wherein the first variant is selected to promote usage of the first featured function to achieve the determined goal of the first user in using the application, from among the plurality of available variants for promoting usage of the first featured function to achieve the determined goal of the first user in using the application, based on both: (a) the efficacy metric that reflects an effectiveness of the first variant in promoting usage of the first featured function to achieve the determined goal, and (b) a preference for the first variant according to a user profile of the first user.

* * * * *